United States Patent [19]

Bamford

[11] Patent Number: 4,776,534
[45] Date of Patent: Oct. 11, 1988

[54] CONTROLLED TORSIONAL RESISTANCE WARPABLE BEAM

[76] Inventor: Robert M. Bamford, 1555 Parway Dr., Glendale, Calif. 91206

[21] Appl. No.: 83,274

[22] Filed: Aug. 10, 1987

[51] Int. Cl.$^4$ ................................................ B64C 3/22
[52] U.S. Cl. ........................................ 244/123; 14/3; 52/690; 52/693; 52/695
[58] Field of Search ................. 244/123, 117 R; 14/3, 14/4, 5, 13, 16.1; 52/690, 693, 695

[56] References Cited

U.S. PATENT DOCUMENTS

| | | | |
|---|---|---|---|
| 2,182,366 | 12/1939 | Van Vliet | 244/123 |
| 3,156,440 | 11/1964 | Ikeda | 244/123 |
| 3,756,541 | 9/1973 | Orazi | 244/123 |

Primary Examiner—Galen Barefoot
Assistant Examiner—Rodney Corl
Attorney, Agent, or Firm—Albert O. Cota

[57] ABSTRACT

A warpable beam allowing a controlled degree of torsional resistance. The beam is formed with an open cross-section channel-shaped structural element (24) that includes a plurality of planar structural elements (28) or (32) that are positioned within the open section and that define the cross sectional shape. A plurality of diagonal structural element s(46) or (48) positioned transversely within the open section and interfaced with the planar elements transmitting shear across segments. A plurality of points of restraint (50) control the warping of the beam as a result of their relative motion. Further, oppositely inclined diagonal elements in different segments are connected in such a manner as to allow relatively free longitudinal motion while transmitting loads. The beam may be used for bridges or boat docks or as a leading edge spar (57) of an airfoil.

22 Claims, 6 Drawing Sheets

CONTROLLED TORSIONAL RESISTANCE WARPABLE BEAM

TECHNICAL FIELD

The present invention pertains to structural beams in general and more specifically to open section beams that allow a degree of warpage within constrained limits and balance shears of the opposite sense and with a fixed ratio of magnitude in different longitudinal segments allowing the resultant of the applied loads to be transferred to support interfaces to provide a beam with nearly the same stiffness as a conventional closed section beam.

BACKGROUND ART

Prior art is replete with teachings of elongate support members and trusses that support applied loads along a span. Many planar or open-section beams have the capability of maintaining their in-plane structural integrity while having appreciable torsional flexibility however, they are limited in their ability to resist their out-of-plane loads comparable to closed section beams of similar dimensions. Controlled torsional resistance, while not claimed, was embodied in an open section beam whose resistance to torsional load would not approach that of a closed section beam with similar dimensions. Other non-planar beams resist more general loading but do not allow appreciable torsional flexibility. Further plenarily controlled torsional resistance beams were generally lacking in the prior art discovered.

A search of the prior art did not disclose any patents that read directly on the claims of the instant invention, however, the following U.S. patents were considered related:

| PATENT NUMBER | INVENTOR | ISSUED |
| --- | --- | --- |
| 4,221,400 | Powers | 21 June 1978 |
| 4,183,596 | Greene, et al | 17 January 1979 |
| 3,778,946 | Wood, et al | 18 September 1973 |
| 3,362,117 | Van Raden | 24 May 1963 |
| 3,279,141 | Schmidt | 18 October 1966 |
| 3,108,665 | Marchant | 29 October 1963 |
| 2,258,046 | Clement | 7 October 1941 |
| 2,089,023 | Hahn | 2 August 1937 |
| 1,949,818 | Tarbox | 6 March 1934 |
| 1,453,114 | Rapp, et al | 24 April 1923 |

Powers teaches the means for adjusting the stiffness of a flexible body by the use of a prestressed curved rod member penetrating a bore with the stiffness adjusted by relocating the rod member at different positions about the longitudinal axis.

Wood et al discloses a planar truss with the camber automatically attained in the chords of the truss by means of tensioned tensors and compression members between the top and bottom chords of the truss.

Marchant utilizes a trellis work non planar structure for supporting rigid or articulated sections composed of metallic shaped sections having a flat bottom with cross stays drawn out into an attachable central portion.

Tarbox teaches a non planar truss member for aircraft with flat sheet metal parts with a portion readily joined to a longitudinal member. The truss is a combination of triangles formed with constituent cap strips and triangulated beading. Its embodiment would have only incidental torsional flexibility.

For background purposes and as indicative of the art to which the invention relates reference may be made to the remaining cited patents.

DISCLOSURE OF THE INVENTION

In many applications, it is necessary to have torsional flexibility in a structural beam such as used in a warpable airfoil for a light-weight aircraft, a bridge, a boat tether or the like while resisting relatively general loading. It is therefore, the primary object of the invention to have a warpable beam constructed with an open cross-section channel-shaped structural element incorporating a gap that allows the beam to have torsional flexibility. The inventive beam design still maintains most of the structural integrity which would have existed had the open section been closed.

Another basic object of the invention is to allow the warp to be accomplished with its magnitude controlled by the reactions while shear loads are carried to these reactions by a combination of interconnected diagonals attached on one side of the gap and translatably attached on the other. This allows twisting to occur while maintaining the strength through the extent of the controlled travel.

Another object of the invention incorporates torsional elastic resistance contributed partially by the out-of-plane stiffness of the planar elements placed within the open portion of an open cross section beam. This allows a selection of resistance by simply varying the planar element thickness while allowing the other elements to remain in their constant state.

Still another object of the invention allows positive stops at the termination of the controlled twist thereby limiting the relative translation of the diagonals with decisive mechanical elements. This ability provides the beam with the ultimate strength of a closed section beam at the end of the torsional travel without appreciable additional stresses.

These and other objects and advantages of the present invention will become apparent from the subsequent detailed description of the preferred and other embodiments and the claims taken in conjunction with the accompanying drawings.

BEST MODE FOR CARRYING OUT THE INVENTION

The best mode for carrying out the invention is presented in terms of a preferred embodiment that includes a number of variations somewhat different in form but similar in scope and precept. The preferred embodiment and its variations are illustrated in FIGS. 1–21 with FIGS. 1–4 depicting the basic form of the invention.

Figure 1:
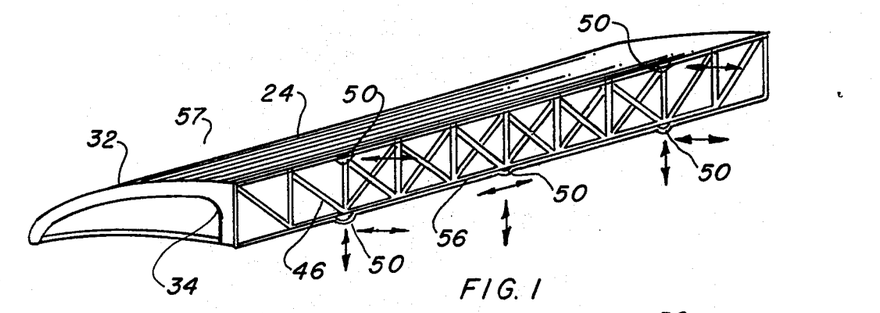
FIG. 1 is a partial isometric view of the preferred embodiment in an open section beam configured in an airfoil leading edge spar shape with warping controlled by the differential motion normal to the gap of four support interfaces.
Figure 2:
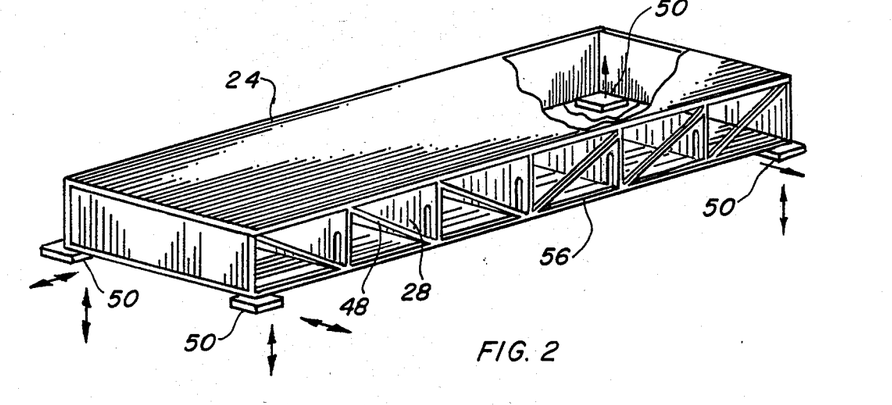
FIG. 2 is a partial isometric view of an open section beam in channel shape with warping controlled by the differential vertical motion of four support interfaces.
Figure 3:
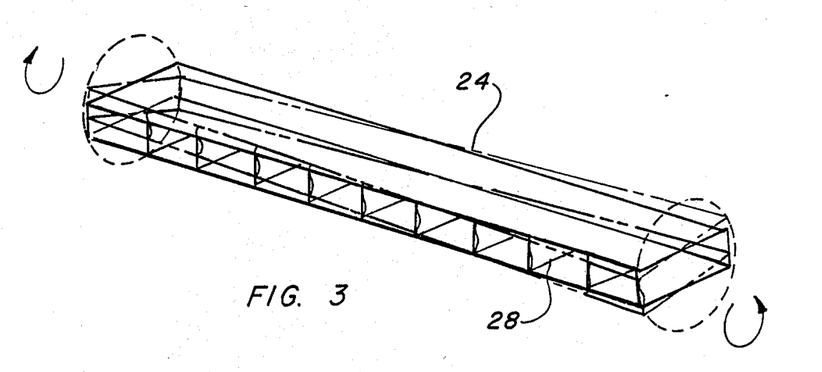
FIG. 3 is a partial isometric view of an open section beam in twisted condition illustrating one direction of twist and the warpage of planar elements by phantom lines and indication of movement arrows with diagonals omitted for clarity.

The warpable beam is comprised of a combination of elements each contributing to the overall utility. An open cross-section channel-shaped structural element 24 is depicted specifically in FIGS. 1, 2, 5, 8 and 14. This element consists of a top, a bottom and an interconnecting web. The top and bottom are essentially parallel and are connected by the web. The open section has a gap that allows the member to have torsional flexibility and the ends to be twisted, relative to each other, as shown in FIG. 3. The channel-shaped structural element 24 may be constructed in the form of three sides of a rectangle, as generally depicted in FIG. 2, for use as a bridge or a boat dock, or any other open section such as that used for the leading edge spar of an airfoil as generally depicted in FIG. 1.

Figures 4, 5, 6, 7:
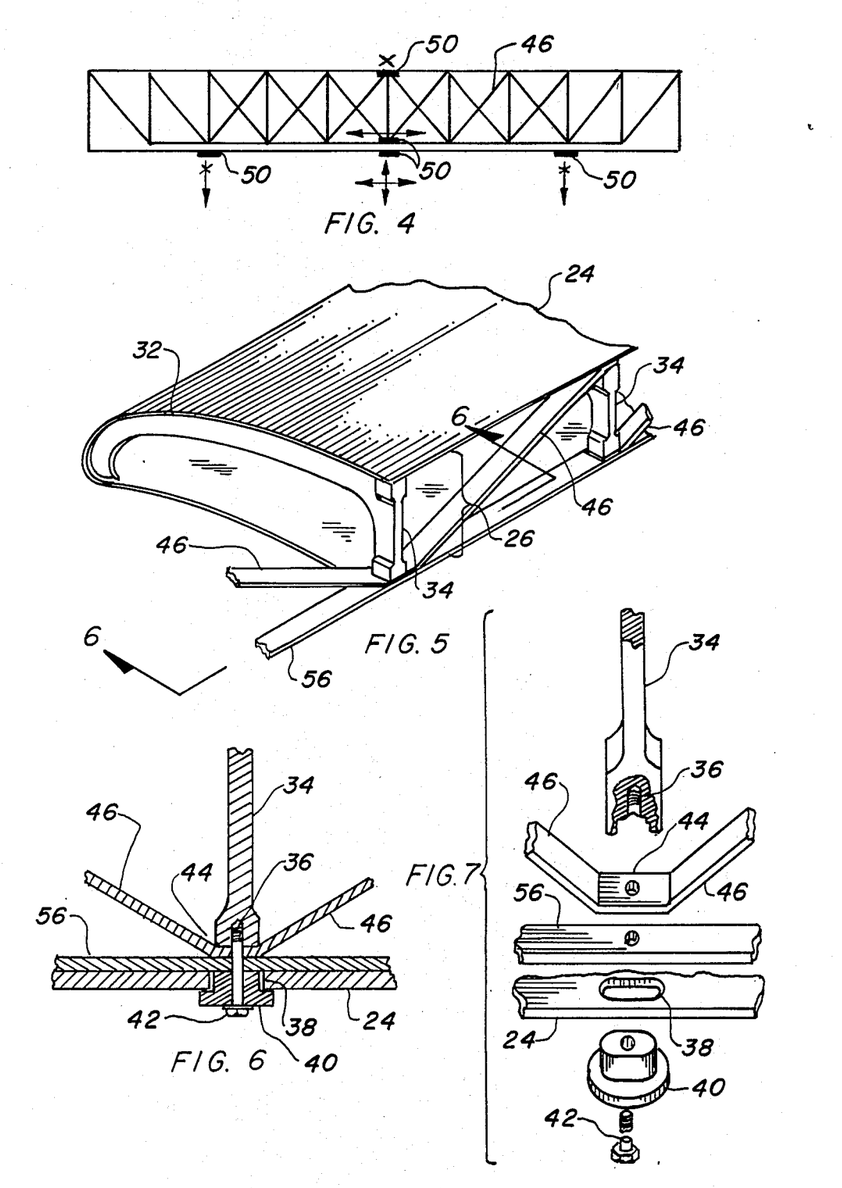
FIG. 4 is a schematic representation of the relationship of the diagonal elements in a beam having multiple segments and warping controlled by differential motion of longitudinal support interfaces.
FIG. 5 is a partial isometric view of a beam with an incomplete ring planar element with two oppositely inclined diagonals directly connected to each other and to a distending leg of the planar element as well as one end of a longitudinal element connecting oppositely inclined diagonals in non-adjacent segments with each end of the longitudinal element at its attachment to the diagonal attached to a distending leg of a planar element.
FIG. 6 is a cross-sectional view taken along lines 6—6 of FIG. 5.
FIG. 7 is a partial exploded view of the embodiment of FIG. 6 completely removed from the partial ring and the remainder of the invention for clarity.
Figure 10:
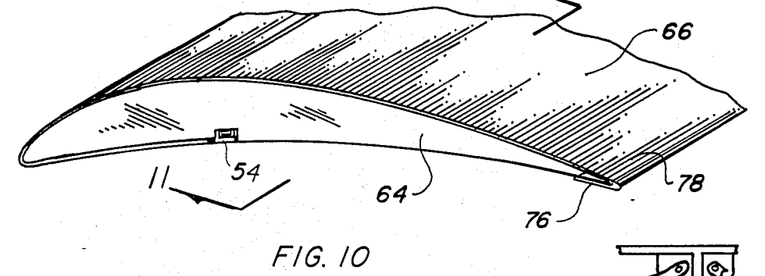
FIG. 10 is a partial view of a beam with a diaphragm planar element extended to form a complete rib with one portion of a connecting element penetrating therethrough.
Figure 14:
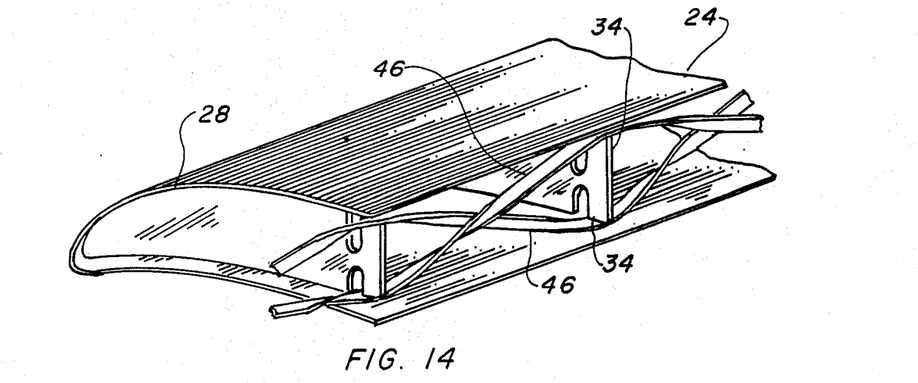
FIG. 14 is an isometric view of a diaphragm with double distending legs and crossed tension only diagonals.

A plurality of planar structural elements 28 or 32 are fixedly positioned within the open section of the channel-shaped structural element 24 normal to its axis. These planar structural elements separate the element 24 into longitudinal segments and maintain the shape of the open cross section while allowing longitudinal motion across the gap 26 as shown in FIG. 5. One configuration of the planar structural element, as illustrated in FIGS. 2, 10 and 14, consists of a diaphragm 28 or 64 that has a selected degree of out-of-plane stiffness encompassing the entire open cross sectional portion of the channel-shaped structural element. The edges of the element 24 are free to move longitudinally, relative to each other, with only limited restriction from the diaphragm 28 or 64.

Figure 8:
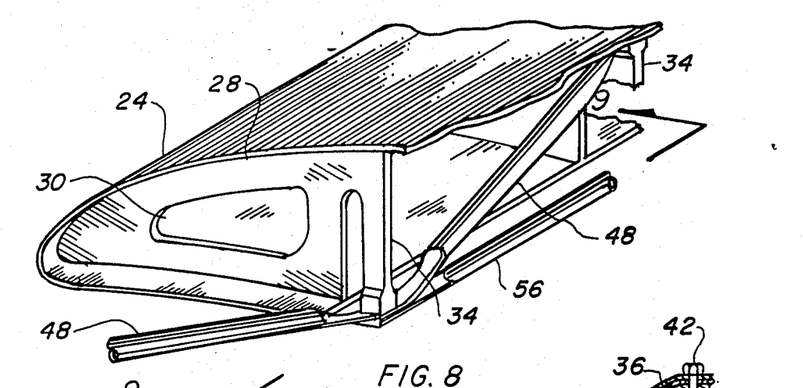
FIG. 8 is a partial isometric view of a beam with a planar element having a leg with directly connected diagonals and half a longitudinal element connecting diagonals in non-adjacent segments.
Figure 9:
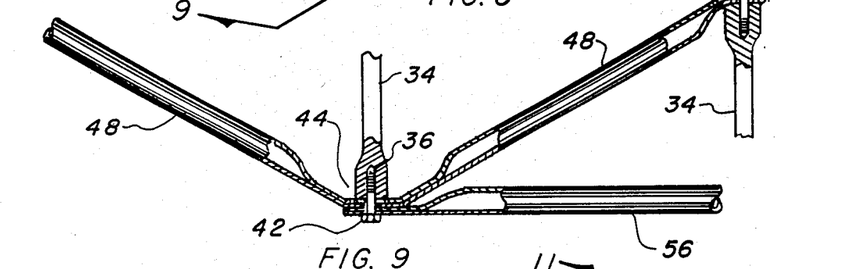
FIG. 9 is a cross-sectional view taken along lines 9—9 of FIG. 8.

Depicted in FIG. 8 is another variation of the diaphragm 28 which functions in the same manner as previously described except that in this design there is an opening 30 in the central portion forming a complete ring. Again, the diaphragm 28 allows relative longitudinal movement across the gap while resisted by the diaphragms out-of-plane stiffness.

The planar structural element, as shown in FIGS. 5–7, consists of an incomplete ring 32 that extends contiguously with the inside of the top and interconnecting web of the channel-shaped structural element 24 and includes an integral leg 34 that extends across the gap 26. This incomplete ring 32 has an open center portion and an open lower edge except at the leg. The ring 32, as shown in FIG. 5, illustrates a configuration that allows the overall weight of the element to be reduced without appreciable loss of structural integrity. This configuration as further detailed in FIGS. 6 and 7, consists of a tapped and counterbored hole that is located within the tip of the leg 34. A slot 38 is located in the channel-shaped structural element 24 on the inside bottom surface near the edge of the gap 26. The slot 38 is in alignment with the internal threads 36 of the leg 34 with the elongated sides parallel to the beam axis. A hollow stepped washer 40 which has a circular flange on one end and a small elongated boss on the other where the boss is disposed within the slot 38. The small boss is sized to easily slip within the slot 38 and the larger circular flanges acts as a head to captivate the channel-shaped structural element 24. The height of the smaller region is greater than the thickness of the channel therefore, the edges of the structural element 24 are free to translate longitudinally relative to each other. A threaded fastener with an unthreaded shank 42 is connected through the stepped washer 40 engaging the internal threads 36 and the unthreaded shank within the leg 34 compressibly attaching the elements together. This arrangement allows longitudinal movement of the tip of the leg 34 and a set of diagonal structural elements 46 or 48 relative to the bottom of the channel-shaped structural element 24 within the controlled limits of the elongated region of the washer 40 within the slot 38.

A plurality of diagonal structural elements 46 or 48 illustrated in FIGS. 1, 2, 4–9, 11–15 and 17, are positioned transversely between the top and bottom of the channel-shaped structural element 24 across the gap 26. The diagonal structural elements 46 or 48 as shown in FIGS. 5 and 14, interface at the intersection of a planar structural element 32 or 28 and the channel-shaped element 24 on the first end and translatably interfaces with the channel-shaped element at its second end at the intersection with the next planar element 32 or 28. They also connect longitudinally to another oppositely inclined diagonal element 46 or 48 as best shown in FIGS. 1, 2 and 4.

More specifically, FIGS. 1, 5 and 14 depict the diagonal elements as a tendon 46 with an attachment to the planar element on the first end at one side of the gap 26 of the channel-shaped structural element 24 and to a connecting means as shown in FIGS. 6 and 7, on the second end on the other side of the gap. This arrangement provides a load path that tranmits tension loads from one end to the other.

Another variation of the diagonal elements consisting of combined tension and compression members 48 is illustrated in FIGS. 8, 9, 11 and 12. Again, attachment is the same as described above but the member has sufficient bending stiffness to carry compression whereas the above tendon 46 is capable of transmitting tension loads only because of its flat ribbon like configuration. The multi junction coupling 54 may be used as the means of connection.

FIGS. 1, 4 and 14 depict multiple sets of diagonal elements 46 within a single segment of the channel-shaped structural element 24 each with its own attachment on the first end to one side of the gap 26 and on the second end to the connecting means 44 on the other side of the gap. Each assembly, in this configuration defines a load path that transmits loads from one end to the other.

FIGS. 5–7 show the diagonal structural elements that are clamped by the threaded fastener 42 between the internal threads 36 of the leg 34 and the stepped washer 40 forming an unyielding affixation 44 of the leg 34 to the combined diagonals 46 in adjacent segments of the channel-shaped structural element 24. This arrangement allows the diagonal elements 46 located in different longitudinal sections to be connected. FIG. 5 also shows the arrangement in non-adjacent sections of the beam together with a longitudinal element forming a means to connect diagonal elements 46 by using the legs 34 of at least two planar structural elements 32.

FIG. 1 shows five support interfaces located on the open cross sectional channel-shaped structural element 24, that are points of restraint. The arrows in all cases, indicate the direction of the force exerted by the interfaces just as X's indicate a restraint normal to the plane of the paper. These points of restraint are normal to the plane of the gap at four points, no three of which are colinear.

The points of restraint 50 restrain vertical motion at two or more points in the plane of the gap 26 as well as longitudinal motion at one point. The motion of one of the four points normal to the plane, defined by the other three, control the warping of the beam. Similarly FIG. 4 illustrates points of restraint 50 in the form of three non-colinear points where all points inhibit motion normal to the plane of the gap and vertical motion at least at two points in the plane of the gap. Further longitudinal motion is restrained at two points, one of which is on the lower surface of the channel-shaped structural element 24 and the other is integral with the means to connect 44 or 54 the diagonal structural elements 46 or 48. Therefore, the relative motion of these two longitudinal points of restraint control the warping of the beam.

FIGS. 6, 7, 9, 11, 12 and 13 illustrate various means to connect the oppositely inclined diagonal structural elements 46 or 48 in different longitudinal segments of the channel-shaped structural element 24. The means to connect 44 or 54 transfer loads to one or more of the planar structural elements 28 or 32 in their plane. This arrangement allows relatively free longitudinal motion across the gap 26 and transmits longitudinal loads from one diagonal element 46 or 48 to another. The elements of the beam jointly resist loads applied to the beam and transmit their resultant to the points of restraint 50.

Figure 11:
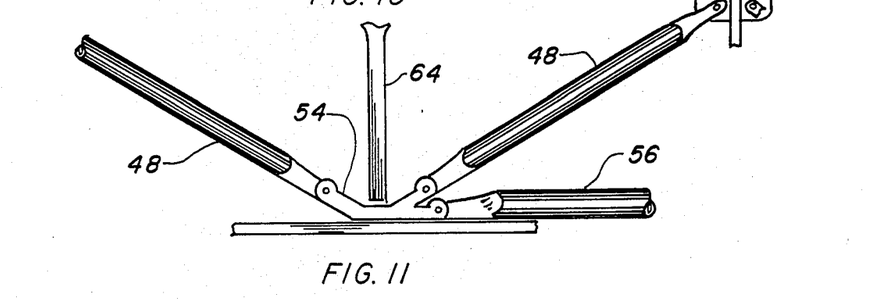
FIG. 11 is a cross-section view taken along lines 11—11 of FIG. 10 showing connection of diagonals in the adjacent segments and half of an element connecting diagonals in non-adjacent segments.
Figure 12:
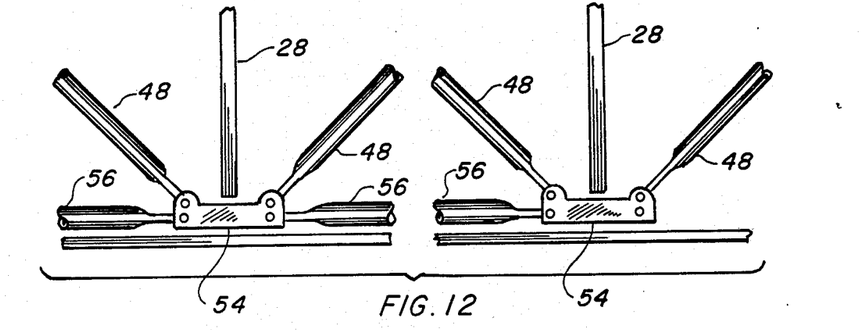
FIG. 12 is a fragmentary view of diagonals and an element connecting diagonals in adjacent segments and portions of a three part element connecting diagonals in non-adjacent segments completely removed from the rest of the invention for clarity.
Figure 13:
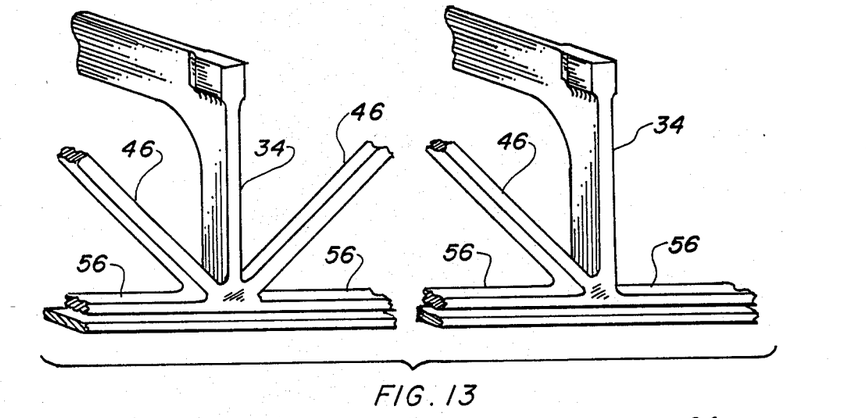
FIG. 13 is a fragmentary view of the diagonals and connecting elements integral with the distending legs of planar elements completely removed from the rest of the invention for clarity.

One means to connect the diagonals 48 consists of a multi-junction coupling 54 as shown in FIGS. 11 and 12 which is slidingly positioned between the bottom of the channel-shaped element 24 and the planar structural elements 28. Further, the means to connect the diagonals may incorporate a longitudinal structural element 56 as shown in FIGS. 1, 2, 4–9 and 11 with equal ease. This longitudinal element 56 incorporates the multi-junction coupling 54 to connect the diagonal elements 48 in non-adjacent segments, the fittings are slideably positioned between the bottom of the channel-shaped member 24 and the planar elements 28.

Figure 18:
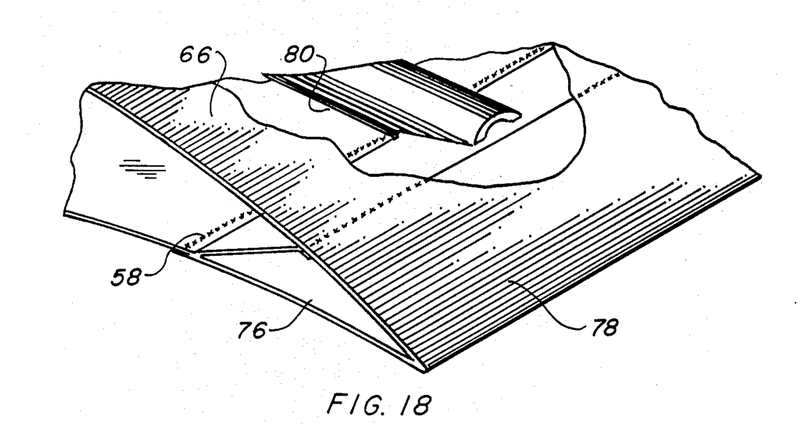
FIG. 18 is a partial cutaway isometric view of the triangular trailing edge element and its junction with a strut from the top of the leading edge spar.

One of the practical applications of the warpable beam is to serve as the leading edge spar 57 of a warpable airfoil. To further this airfoil utility, other elements must be incorporated to complete the embodiment. FIG. 18 best illustrates an airfoil with a trailing edge structural element 76 having the appropriate shape. This trailing edge element may be in the form of a tendon 60, as best shown in FIG. 15, that is stretched between the aft ends of the two tip elements 62 forming the rear edge of the airfoil.

A means to locate the trailing edge 60 or 76 in an appropriate position relative to the airfoil cross-section is by direct attachment of the trailing edge to the trailing edge of a rib 64 that is an extended version of the planar structural element as shown in FIG. 10. This rib 64 serves to maintain the appropriate airfoil section.

Figure 16:
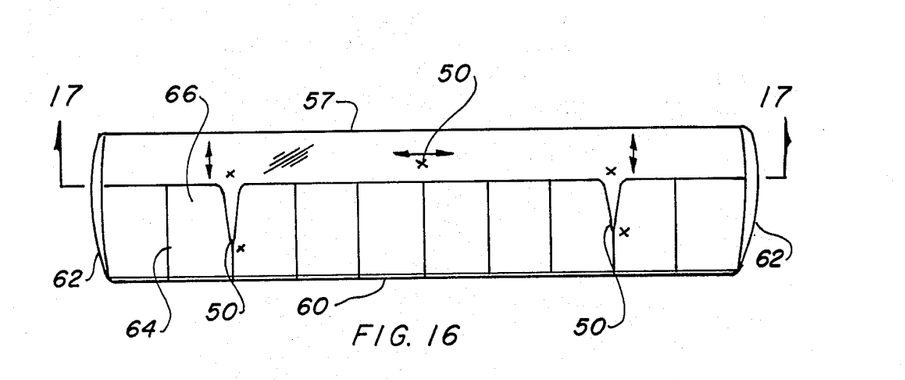
FIG. 16 is a plan view of a wing incorporating a controlled torsionally resistant beam as its leading edge spar showing torsion links which transmit wing warping control at four out of plane supports of the wing indicated with "X's" to the leading edge spar.
Figure 17:
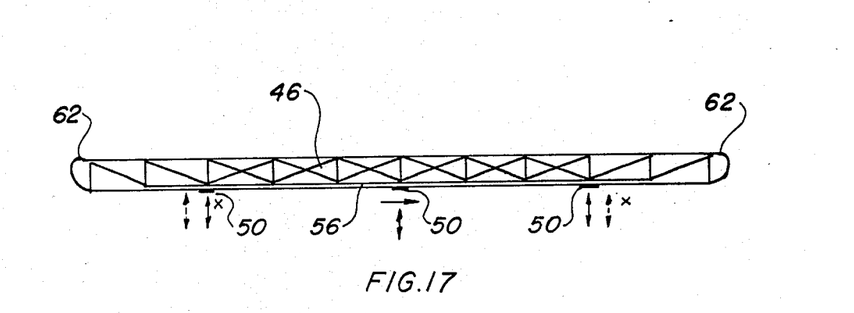
FIG. 17 is a cross-sectional view taken along lines 17—17 of FIG. 16.

A tip element 62 is positioned at each end of the airfoil and has kinematic attachment to the beam. Each tip has an appropriate aerodynamic shape forming its outwardly extending boundary. The tips 62 are illustrated in FIGS. 15–17 however, they may be altered in configuration without departing from the intent of the invention.

Figure 15:
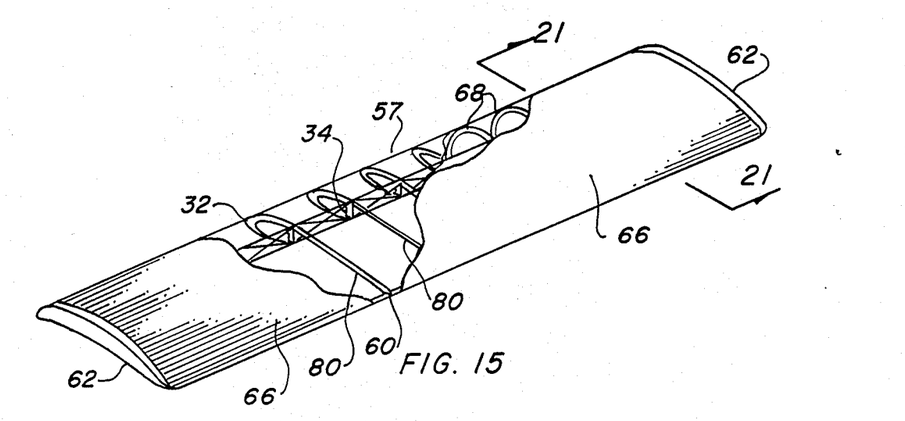
FIG. 15 is a partial isometric of a wing incorporating a controlled torsionally resistant beam as its leading edge spar showing a membrane enclosing both leading and trailing edge elements and struts from the top of the leading edge spar to the trailing edge element.
Figure 21:
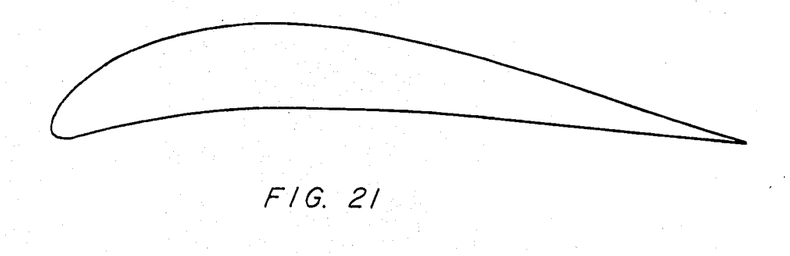
FIG. 21 is a cross-sectional view taken along lines 21—21 of FIG. 15 showing a membrane section shape that can be determined from the same pressure distribution using either airfoil section theory or methods of cylindrical membrane analysis.

A membrane 66, as shown best in FIG. 15, covers the external surfaces of the airfoil in the regions bounded by the leading edge spar 57, the trailing edge element 60 or 76 and the two tip elements 62. This membrane may be comprised of any material suitable for the purpose such as plastic in the form of a film such as mylar, polyethylene, polyvinyl chloride and the like, or a woven fabric such as nylon, dacron, cotton, etc. In any event, the membrane may enclose both the warpable beam leading edge spar 57 and the trailing edge element 60 or 76 while being attached to each of the tip elements 62. The airfoil cross section shape, depicted in FIG. 21, is such that the ratio of the chordwise membrane stress to the chordwise radius of curvature equals the difference between the internal pressure and external aerodynamic pressure associated with the cross section at a reasonable angle of attack. The membrane stress is contant over the upper surface and also constant over the lower surface with the difference between the two surface stresses being reacted by the shear transmitting devices 68 and 58 located at the leading edge spar 57 and trailing edge element 60 or 76 of the airfoil. The shear transmitting devices 68 and 58 jointly provide the means to assure that an appropriate airfoil shape in the membrane is maintained.

Further, the chordwise section of the leading edge spar 57 and the airfoil tips 62 are consistent with the cross sectional shape of the membrane 66. Note that the cross sectional shape has no slope discontinuity at the transition from the leading edge spar 57 to the membrane surface 66.

Figures 19, 20:
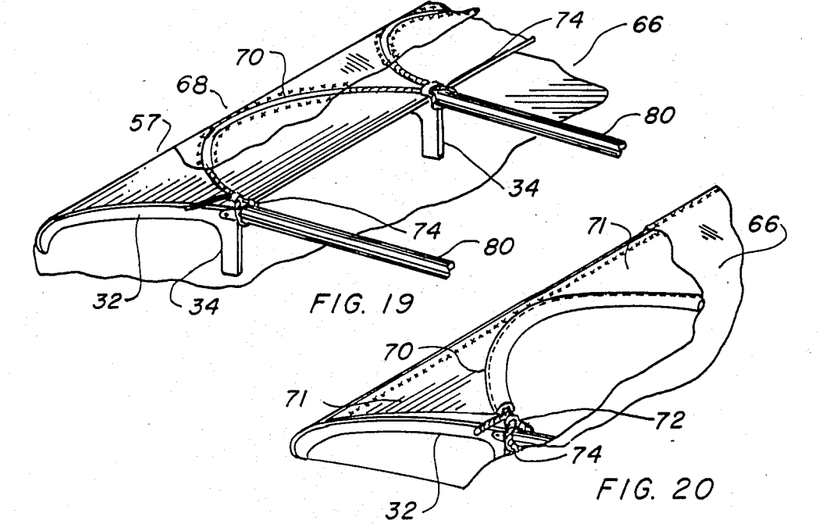
FIG. 19 is a partial cutaway isometric view of a tendon in a pocket directly in the membrane.
FIG. 20 is a partial cutaway isometric view of a tendon in a pocket of a curtain attached to the membrane.

The shear transmitting devices 68 at the leading edge spar 57 may more specifically be composed of a plurality of appropriately curved pockets 70 formed in the enclosing membrane 66 shown in FIG. 19, and a tendon 72 draped within the pockets 70 transmitting shear loads from the membrane to points of attachment 74 to the leading edge spar 57. FIG. 20 illustrates a similar arrangement wherein the tendon 72 is draped within pockets 70 in a curtain 71 attached to the enclosing membrane transmitting shear loads from the membrane 66 to the leading edge spar 57.

FIG. 18 further illustrates a shear transmitting device 58 at the trailing edge. This embodiment includes a triangular cross section trailing edge element 76 that is enclosed in a trailing edge pocket 78 in the membrane 66 with the triangular cross section element 76 having at its trailing edge a suitable angle and its lower forward apex well forward of the upper forward apex. With this arrangement, the chordwise membrane stress in the upper surface of the trailing edge pocket 78 is approximately the sum of the chordwise membrane stress in the upper surface of the remainder of the airfoil plus the membrane stress in the forward surface of the trailing edge pocket 78. Further, the membrane stress in the lower surface of the airfoil is approximately the sum of the membrane stress in the lower and forward surfaces of the trailing edge pocket 78.

The attachment of the trailing edge element 60 or 76 may be by the ribs 64 as shown in FIG. 10 or struts 80 as depicted in FIG. 15. Struts 80 are oriented chordwise between the trailing edge structural element 60 or 76 and the upper edge of the channel-shaped structural element 24. Further, the trailing edge structural element 60 or 76 is attached to the lower surface portion of the membrane 66.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the claims.

I claim:

1. A warpable beam having controlled torsional resistance composed of elements which comprise:
   (a) an open cross-section channel-shaped structural element having a top, bottom and an interconnecting web with the top and bottom being in an essentially parallel relationship and having within the open section a gap that implies torsional flexibility therewith,
   (b) a plurality of planar structural elements fixedly positioned within the open section of the channel-shaped structural element normal to the axis and, separating longitudinal segments thereof maintaining the shape of the open cross section of the channel-shaped structural element without preventing relative longitudinal motion across the gap,
   (c) a plurality of diagonal structural elements positioned transversely between the top and bottom of said channel-shaped structural element across the gap and interfacing at the intersection of a planar structural element and the channel-shaped structural element on the first end and on the second end translatably interfacing with a next planar structural element and longitudinally connected to an oppositely inclined diagonal structural element in a different segment,
   (d) a plurality of support interfaces located on the open cross-section channel-shaped structural element where the motion of said interfaces control the warping of the beam and,
   (e) means to connect the oppositely inclined diagonal structural elements in different longitudinal segments of the channel-shaped structural element within the gap transferring loads to one or more of said planar structural elements in their plane, allowing relatively free longitudinal motion across the gap and transmitting longitudinal loads from one oppositely inclined diagonal structural element to the other where the elements of the beam jointly resist loads applied to the beam, and transmit their resultant to said support interfaces.

2. The warpable beam having controlled torsional resistance as recited in claim 1 wherein
   the planar structural elements further comprise a diaphragm having a selected degree of stiffness encompassing the entire open cross sectional portion of the channel-shaped structural element the edges of which are free to move longitudially with only limited restriction from the diaphragm.

3. The warpable beam having controlled torsional resistance as recited in claim 1 wherein
   the planar structural elements further comprise a diaphragm having an opening in the central portion thereof, forming a complete ring.

4. The warpable beam having controlled torsional resistance as recited in claim 1 wherein the planar structural elements further comprise:
   (a) an incomplete ring extending along the top and interconnecting web of the channel-shaped structural element having an integral leg extending across the gap further having an open center portion and an open lower edge, except at the leg, for reducing overall weight without appreciable loss of structural integrity,
   (b) internal threads integral with the tip of the leg of the incomplete ring,
   (c) a slot in the channel-shaped structural element located on its bottom surface near the gap edge, said slot being in alignment with the internal threads of the leg of the incomplete ring with the elongated sides parallel to the beam axis,
   (d) a hollow stepped washer having a first and second step, the first step being a small elongated boss with semi-circular ends having a thickness greater than said channel-shaped structural element and with the second step being a circular flange of a diameter larger than the boss with the washer boss disposed within the slot of said channel-shaped structural element, and (e) a threaded fastener connected through the hollow of the stepped washer, engaging the internal threads within the leg of the incomplete ring compressing the elements together while allowing longitudinal movement of the tip of the leg relative to the bottom of the channel-shaped structural member within controlled limits of the slot.

5. The warpable beam having controlled torsional resistance as recited in claim 1 wherein
the diagonal structural elements of the warpable beam further comprise a tendon with an attachment to the planar element on the first end at one side of the gap of the channel-shaped structural element and on the second end at the other side of the gap to said connecting means thus defining a load path that transmits tension loads from one end to the other.

6. The warpable beam having controlled torsional resistance as recited in claim 1 wherein
the diagonal structural elements of the warpable beam further comprise combined tension and compression members with attachment on the first end to one side of the gap of the channel-shaped structural element and on the second end at the other side of the gap to said connecting means thus defining a load path that transmits either tension or compression loads from one end to the other.

7. The warpable beam having controlled torsional resistance as recited in claim 1 wherein
the diagonal structural elements of the warpable beam further comprise multiple diagonals within a single segment of the channel-shaped structural element each with its own attachment on the first end to the planar element at one side of the gap of the channel-shaped structural element and on the second end at the other side of the gap to said connecting means where each assembly defines a load path that transmits loads from one end to the other.

8. The warpable beam having controlled torsional resistance wherein
the incomplete ring and integral leg of the planar structural elements as recited in claim 4 further comprise diagonal structural elements that are clamped by the threaded fastener between the internal threads of the leg and the stepped washer forming an unyielding affixation of the leg to the combined diagonal structural elements in adjacent segments of the channel-shaped structural element forming said means to connect the diagonal elements in different longitudinal segments.

9. The warpable beam having controlled torsional resistance as recited in claim 1 wherein
the means to connect the oppositely inclined elements of the warpable beam further comprise a structural element connecting adjacent diagonals in different segments of the channel-shaped structural element which is slidingly positioned between the bottom of said channel-shaped structural element and said planar structural element in such a manner as to allow transfer of loads without preventing longitudinal motion.

10. The warpable beam having controlled torsional resistance wherein
the integral leg of two planar structural elements as recited in claim 4 further comprise a longitudinal structural element connecting the ends of the diagonal structural elements in the clamped assembly along the threaded fasteners between the internally threaded element and the elongated washer forming an unyielding affixation of the legs to the diagonal structural elements in non-adjacent segments of the beam forming said means to connect the elements.

11. The warpable beam having controlled torsional resistance as recited in claim 1 wherein
the means to connect the oppositely inclined diagonal structural elements of the warpable beam further comprise a longitudinal structural element having end fittings connecting diagonal structural elements in non-adjacent segments of the channel-shaped structural element in which each fitting is slidingly positioned between the bottom of said channel-shaped structural element and one of said planar structural elements in such a manner to allow transfer of loads therewith without preventing longitudinal motion.

12. The warpable beam having controlled torsional resistance as recited in claim 1 wherein
the support interfaces of the warpable beam further comprise points of restraint normal to the plane of the gap of four points, no three of which are colinear, where said interfaces also restrain vertical motion at two or more points in the plane of the gap as well as longitudinal motion at one point, such that the motion of one of said four points normal to the plane, defined by the other three, controls warping of the beam.

13. The warpable beam having controlled torsional resistance as recited in claim 1 wherein
the support interfaces of the warpable beam further comprise points of restraint normal to the plane of the gap at three non-colinear points where said interfaces also restain vertical motion at two or more points in the plane of the gap as well as longitudinal motion at two points one of which is on the lower surface of the channel-shaped structural element and the other is integral with the means to connect diagonal structural elements, where the relative motion of the two longitudinal restraints control warping of the beam.

14. The warpable beam as recited in claim 1 wherein said beam comprises a cross sectional shape that is configured to serve as the leading edge spar of an airfoil wherein said airfoil further comprises:

(a) a trailing edge structural element having a cross sectional shape appropriate for the trailing edge spar of said airfoil, (b) means to locate the trailing edge structural element in an appropriate position relative to said airfoil cross section, (c) a tip element located at each end of said beam with kinematic attachment thereto where each tip element has an appropriate aerodynamic shape forming its outwardly extending boundary, (d) a membrane which covers the external surfaces of said airfoil in the regions bounded by the leading edge spar, the trailing edge structural element and the two tip elements, and (e) means to ensure that an appropriate airfoil shape is maintained in said membrane.

15. The warpable beam having controlled torsional resistance wherein
the trailing edge structural element as recited in claim 14 further comprises a tendon that is stretched between the aft ends of the two tip elements forming the rear edge of said airfoil.

16. The warpable beam having controlled torsional resistance wherein
the membrane as recited in claim 14 encloses both the warpable beam and the trailing edge structural elements and is attached to each of the tip elements.

17. The warpable beam having controlled torsional resistance wherein
the membrane as recited in claim 16 has a cross sectional shape, between the airfoil leading edge spar and trailing edge structural element, such that the ratio of chordwise membrane stress to the chordwise radius of curvature equals the difference between the internal pressure and external aerodynamic pressure, where said membrane stress is constant over the upper surface, constant over the lower surface, with the difference between the upper and lower surface constants being reacted by shear transmitting devices at the leading and trailing edge elements of the airfoil, where these devices are the means to assure an appropriate airfoil section shape and where the chordwise section of the leading edge spar and airfoil tips are consistant with said cross sectional shape of said membrane and where the cross sectional shape has no slope discontinuity at the transition from the beam to the membrane surface.

18. The warpable beam as recited in claim 14 wherein the planar structural elements of said beam are extended to form ribs in an airfoil shape where said ribs maintain an appropriate airfoil section in the membrane area and where direct attachment to said ribs serves as the means to locate the trailing edge element.

19. The warpable beam having controlled torsional resistance wherein
the shear transmitting devices at the leading edge of the airfoil as recited in claim 17 further comprises a plurality of pockets formed in said enclosing membrane, and a tendon draped within said pockets transmitting shear loads therewith to the points of attachment of the tendon to the leading edge spar.

20. The warpable beam having controlled torsional resistance wherein
the shear transmitting devices at the leading edge of the airfoil as recited in claim 17 further comprises a curtain attached to the enclosing membrane and a tendon draped within pockets in the curtain transmitting shear loads to supports on the leading edge spar.

21. The warpable beam having controlled torsional resistance wherein
the shear transmitting device at the trailing edge element of the airfoil as recited in claim 17 further comprises a triangular cross section trailing edge element enclosed in a pocket in the membrane with said triangular cross section having at its trailing edge an angle suitable for the trailing edge of the airfoil and with its lower forward apex well forward of the upper forward apex such that the chordwise membrane stress in the upper surface of the pocket is approximately the chordwise membrane stress in the upper surface of the remainder of the airfoil plus the membrane stress in the forward surface of the pocket and the membrane stress in the lower surface of the airfoil is approximately the sum of the membrane stress in the lower and forward surface of the pocket.

22. The warpable beam having controlled torsional resistance wherein
the means to locate the trailing edge of said trailing edge structural element, as recited in claim 17, comprises a plurality of struts oriented chordwise between the trailing edge structural element and the upper edge of the channel-shaped structural element where the trailing edge structural element is also attached to the lower surface membrane.

* * * * *